United States Patent
Botonjic et al.

(10) Patent No.: US 12,243,158 B2
(45) Date of Patent: Mar. 4, 2025

(54) ENSEMBLE LEARNING FOR CROSS-RANGE 3D OBJECT DETECTION IN DRIVER ASSIST AND AUTONOMOUS DRIVING SYSTEMS

(71) Applicant: Volvo Car Corporation, Gothenburg (SE)

(72) Inventors: Saudin Botonjic, Gothenburg (SE); Sihao Ding, Sunnyvale, CA (US); Ying Li, Sunnyvale, CA (US); Cheng Zhang, Columbus, OH (US); Oskar Karnblad, Västra Götaland (SE)

(73) Assignee: Volvo Car Corporation, Sweden (SE)

( * ) Notice: Subject to any disclaimer, the term of this patent is extended or adjusted under 35 U.S.C. 154(b) by 266 days.

(21) Appl. No.: 17/136,239

(22) Filed: Dec. 29, 2020

(65) Prior Publication Data
US 2022/0207822 A1    Jun. 30, 2022

(51) Int. Cl.
*G06T 17/00*    (2006.01)

(52) U.S. Cl.
CPC .... *G06T 17/00* (2013.01); *G06T 2207/10028* (2013.01); *G06T 2207/20081* (2013.01)

(58) Field of Classification Search
CPC .......... G06T 17/00; G06T 2207/10028; G06T 2207/20081
See application file for complete search history.

(56) References Cited

U.S. PATENT DOCUMENTS

| | | | | |
|---|---|---|---|---|
| 2017/0372527 A1* | 12/2017 | Murali | ................. | H04N 13/239 |
| 2019/0163990 A1* | 5/2019 | Mei | ..................... | G01C 21/3826 |
| 2019/0385025 A1* | 12/2019 | McMichael | ............ | G06V 10/82 |
| 2021/0303911 A1* | 9/2021 | Li | ......................... | G06N 3/045 |

FOREIGN PATENT DOCUMENTS

| | | | |
|---|---|---|---|
| CN | 112154454 A | * 12/2020 | |
| WO | WO-2020247258 A1 | * 12/2020 | ............. A61B 5/742 |

* cited by examiner

Primary Examiner — Wednel Cadeau
(74) Attorney, Agent, or Firm — Clements Bernard Walker; Christopher L. Bernard (57) ABSTRACT

A cross-range 3D object detection method and system operable for training a 3D object detection model with N sub-groups of a point cloud corresponding to N detection distance ranges to form N 3D object detection models forming an ensemble 3D object detection model. Training the 3D object detection model with the N sub-groups of the point cloud corresponding to the N detection distance ranges includes training the 3D object detection model progressively from distant to near. Training the 3D object detection model with the N sub-groups of the point cloud corresponding to the N detection distance ranges includes, each time the 3D object detection model converges, saving resulting weights and adding a corresponding network to the ensemble 3D object detection model.

13 Claims, 6 Drawing Sheets

ENSEMBLE LEARNING FOR CROSS-RANGE 3D OBJECT DETECTION IN DRIVER ASSIST AND AUTONOMOUS DRIVING SYSTEMS

TECHNICAL FIELD

The present disclosure relates generally to the driver assist (DA) and autonomous driving (AD) fields. More particularly, the present disclosure relates to ensemble learning for cross-range three-dimensional (3D) object detection in DA and AD systems.

BACKGROUND

Figure 1:
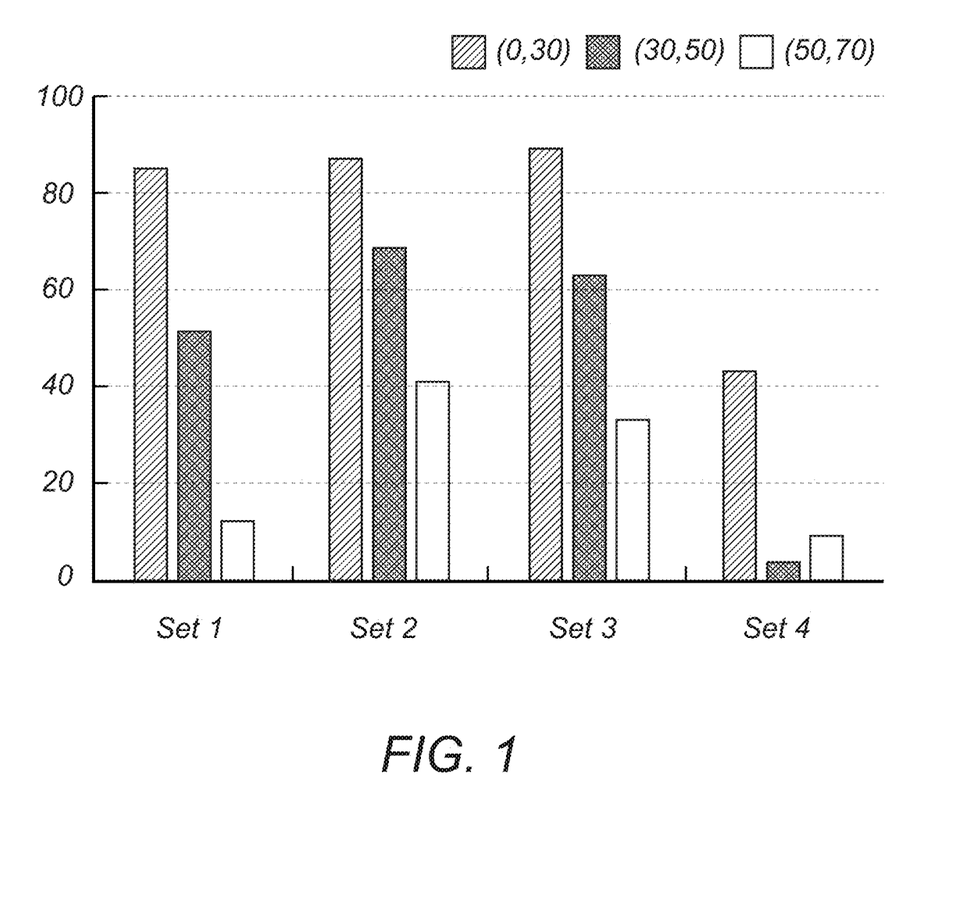
FIG. 1 is a graph illustrating conventional 3D object detection in different range groups, showing POINTRCNN $AP_{3D}$ results with several conventional datasets using a model trained on completed point clouds and evaluated on three depth ranges: 0-30 m, 30-50 m, and 50-70 m; demonstrating that the LiDAR-based 3D object detectors fail to perform adequately for long-range point clouds.

Light detection and ranging (LiDAR)-based 3D object detection is crucial for autonomous vehicles to accurately detect and localize vehicles and pedestrians in 3D to drive safely. The past few years have witnessed great progress in the this area. However, despite such progress, the performance of 3D detectors dramatically decreases when applied to far-range point clouds, as illustrated in FIG. 1. Thus, 3D object detection algorithms trained on point clouds may be overconfident with respect to near-range objects while neglecting vehicles or pedestrians which are far away from the LiDAR sensor.

It is, therefore, crucial to understand the reasons why 3D object detectors overfit with respect to near-range objects before they are applied for cross-range inference, and to identify techniques to bridge gaps between different ranges (i.e., depths).

It should be noted that this background is provided as illustrative context and environment only. It will be readily apparent to those of ordinary skill in the art that the principles of the present disclosure may be applied in other contexts and environments equally.

SUMMARY

The present disclosure evaluates several conventional 3D object detectors with LiDAR point clouds in a dataset. Concretely, the present disclosure trains a detector on one range group or domain and applies it to another range group or domain. When tested on a different range group or domain, the 3D object detector fails. This indicates that the detector has indeed overfitted to its training domain, and it is difficult to mitigate such domain gap.

In order to overcome this challenge, conventional solutions are built upon adversarial feature matching at different depths. Instead, the present disclosure provides a straightforward approach that uses multiple models to handle objects in different ranges. This is comparable to using cameras with different lenses for multi-range two-dimensional (2D) object detection, which has proven successful for DA and AD systems. Such ensemble learning results in marked improvements in cross-range performance.

In one illustrative embodiment, the present disclosure provides a cross-range 3D object detection method, including: training a 3D object detection model with N sub-groups of a point cloud corresponding to N detection distance ranges to form N 3D object detection models forming an ensemble 3D object detection model. Training the 3D object detection model with the N sub-groups of the point cloud corresponding to the N detection distance ranges includes training the 3D object detection model progressively from distant to near. Training the 3D object detection model with the N sub-groups of the point cloud corresponding to the N detection distance ranges includes, each time the 3D object detection model converges, saving resulting weights and adding a corresponding network to the ensemble 3D object detection model. Training the 3D object detection model with the N sub-groups of the point cloud corresponding to the N detection distance ranges includes dividing the point cloud into the N sub-groups corresponding to the N detection distance ranges and training the 3D object detection model separately for each of the N sub-groups. Alternatively, training the 3D object detection model with the N sub-groups of the point cloud corresponding to the N detection distance ranges includes training the 3D object detection model with the entire point cloud while progressively adding the N sub-groups from distant to near. The method further includes receiving a point cloud and detecting objects in the N detection distance ranges using the ensemble 3D object detection model, wherein each of the N detection distance ranges is handled by a corresponding one of the N 3D object detection models.

In another illustrative embodiment, the present disclosure provides a cross-range 3D object detection system, including: a memory storing instructions executed by a processor for training a 3D object detection model with N sub-groups of a point cloud corresponding to N detection distance ranges to form N 3D object detection models forming an ensemble 3D object detection model. Training the 3D object detection model with the N sub-groups of the point cloud corresponding to the N detection distance ranges includes training the 3D object detection model progressively from distant to near. Training the 3D object detection model with the N sub-groups of the point cloud corresponding to the N detection distance ranges includes, each time the 3D object detection model converges, saving resulting weights and adding a corresponding network to the ensemble 3D object detection model. Training the 3D object detection model with the N sub-groups of the point cloud corresponding to the N detection distance ranges includes dividing the point cloud into the N sub-groups corresponding to the N detection distance ranges and training the 3D object detection model separately for each of the N sub-groups. Alternatively, training the 3D object detection model with the N sub-groups of the point cloud corresponding to the N detection distance ranges includes training the 3D object detection model with the entire point cloud while progressively adding the N sub-groups from distant to near. The memory further stores instructions executed by the processor for receiving a point cloud and detecting objects in the N detection distance ranges using the ensemble 3D object detection model, wherein each of the N detection distance ranges is handled by a corresponding one of the N 3D object detection models.

In a further illustrative embodiment, the present disclosure provides a non-transitory computer-readable medium including cross-range 3D object detection instructions stored in a memory and executed by a processor to carry out steps including: training a 3D object detection model with N sub-groups of a point cloud corresponding to N detection distance ranges to form N 3D object detection models forming an ensemble 3D object detection model. Training the 3D object detection model with the N sub-groups of the point cloud corresponding to the N detection distance ranges includes training the 3D object detection model progressively from distant to near. Training the 3D object detection model with the N sub-groups of the point cloud corresponding to the N detection distance ranges includes, each time the 3D object detection model converges, saving resulting weights and adding a corresponding network to the ensemble 3D object detection model. Training the 3D object detection model with the N sub-groups of the point cloud corresponding to the N detection distance ranges includes dividing the point cloud into the N sub-groups corresponding to the N detection distance ranges and training the 3D object detection model separately for each of the N sub-groups. Alternatively, training the 3D object detection model with the N sub-groups of the point cloud corresponding to the N detection distance ranges includes training the 3D object detection model with the entire point cloud while progressively adding the N sub-groups from distant to near. The steps further include receiving a point cloud and detecting objects in the N detection distance ranges using the ensemble 3D object detection model, wherein each of the N detection distance ranges is handled by a corresponding one of the N 3D object detection models.

BRIEF DESCRIPTION OF THE DRAWINGS

The present disclosure is illustrated and described with reference to the various drawings, in which like reference numbers are used to denote like system components/method steps, as appropriate, and in which.

DESCRIPTION OF ILLUSTRATIVE EMBODIMENTS

Again, the present disclosure evaluates several conventional 3D object detectors with LiDAR point clouds in a dataset. Concretely, the present disclosure trains a detector on one range group or domain and applies it to another range group or domain. When tested on a different range group or domain, the 3D object detector fails. This indicates that the detector has indeed overfitted to its training domain, and it is difficult to mitigate such domain gap.

In order to overcome this challenge, conventional solutions are built upon adversarial feature matching at different depths. Instead, the present disclosure provides a straightforward approach that uses multiple models to handle objects in different ranges. This is comparable to using cameras with different lenses for multi-range 2D object detection, which has proven successful for DA and AD systems. Such ensemble learning results in marked improvements in cross-range performance.

3D object detection is one conventional methodology that has been studied. The main challenge of LiDAR-based object detection is to properly encode the points so as to predict point labels or draw bounding boxes in 3D to locate objects. Frustum PointNet, for example, applies PointNet to each frustum proposal from a 2D object detector; POINTRCNN learns 3D proposals from PointNet++ features. MV3D projects LiDAR points into frontal and bird's eye views (BEVs) to obtain multi-view features; PIXOR and LaserNet show that properly encoding features in one view is sufficient to localize objects. VoxelNet and PointPillar encode 3D points into voxels and extract features by 3D convolutions and PointNet. ATGContFuse and ATG-MMF perform continuous convolutions to fuse visual and LiDAR features.

Domain adaptation in point clouds (Unsupervised) is also a conventional methodology that has been studied in AD scenes, but only for the tasks of 2D semantic segmentation and object detection. The common procedure is to adapt a model trained from one labeled source domain (e.g., synthetic images) to an unlabeled target domain (e.g., real images). The domain difference is primarily from the input signal (e.g., image styles), and many algorithms have built upon adversarial feature matching. Recent work has conducted cross-dataset or cross-sensor adaptation via point cloud completion and transfer learning from output space statistics.

Ensemble learning in neural networks (NNs) has been studied and applied in machine learning (ML). Snapshot ensemble, as an alternative to traditional ensembles, is a so-called "implicit" ensemble that has high efficiency during both training and testing.

The object detection benchmark dataset used contains 7,481 images for training and 7,518 images for testing. The training set is further separated into 3,712 training and 3,769 validation images. For each image, the dataset provides its corresponding 64-beam LiDAR point cloud and the stereo image. More relevant statistics are provided in Table 1.

TABLE 1

Summary Statistics of Number of Examples in the Training and Validation Sets

| | #Train/#Validation | | |
|---|---|---|---|
| Category | (0, 30] | (30, 50] | (50, 70] |
| Car | 7635/8701 | 4619/4267 | 2103/1417 |
| Pedestrian | 1797/2073 | 352/160 | 58/47 |
| Cyclist | 549/528 | 170/268 | 15/97 |
| Van | 570/681 | 409/468 | 318/468 |
| Person Sit | 56/166 | 0/0 | 0/0 |
| Truck | 127/107 | 253/98 | 108/401 |
| Tram | 56/95 | 39/104 | 129/88 |
| Misc | 193/313 | 101/173 | 43/150 |
| Total | 10983/12664 | 5943/5538 | 2774/2668 |

The present disclosure focuses on the evaluation of vehicles within three range groups: (0, 30], (30, 50], and (50, 70] m. The dataset evaluates three cases: Easy, Moderate, and Hard. Specifically, it labels each ground truth box with four levels (0 to 3) of occlusion/truncation. The Easy case contains level-0 vehicles whose bounding box heights in 2D are larger than 40 pixels; the Moderate case contains level-0, 1 vehicles whose bounding box heights in 2D are larger than 25 pixels; the Hard case contains level-0, 1, 2 vehicles whose bounding box heights in 2D are larger than 25 pixels. The heights are meant to separate vehicles by their depths with respect to the observing vehicle.

The present disclosure uses the dataset to evaluate object detection in 3D and the a BEV. The Car category is focused on, which has been the main focus in existing works. An average precision (AP) with intersection over union (IoU) thresholds at 0.7 is reported: a vehicle is correctly detected if the IoU with the predicted 3D box is larger than 0.7. The AP for the 3D and BEV tasks is denoted by $AP_{3D}$ and $AP_{BEV}$.

TABLE 2

LiDAR-based 3D Object Detection Algorithms Investigated With Both 1-Stage and 2-Stage Detectors and Different Types of Point Encoding Methods

| Method | Venue | Arc. | Feature |
|---|---|---|---|
| SECOND | Sensors18 | 1-stage | Voxel |
| PointPillar | CVPR19 | 1-stage | Voxel |
| 3DSSD | CVPR20 | 1-stage | Point-based |
| PointRCNN | CVPR19 | 2-stage | PointNet |
| Part-$A^2$ | PAMI20 | 2-stage | SparseConv |
| PV-RCNN | CVPR20 | 2-stage | Voxel CNN |

Six LiDAR-based models are tested, as shown in Table 2. The present disclosure mainly mainly focuses on POINTRCNN in the following experiments. POINTRCNN has two sub-networks, the region proposal network (RPN) and region convolutional neural network (RCNN), that are trained separately. The RPN is trained first, for 200 epochs with batch size 16 and learning rate 0.02. The RCNN is trained for 70 epochs with batch size 4 and learning rate 0.02. Online ground truth boxes augmentation is used, which copies object boxes and inside points from one scene to the same locations in another scene.

In terms of cross-range results, the present disclosure first conducts cross-range experimentation on three range groups. When training on one range group, out-of-range objects are masked out by zeroing the loss values when in the back-propagation. The cross-range experimental results are provided in Table 3 and Table 4.

It can be seen that POINTRCNN is fairly well within the domain if the training and testing examples are from the same depth. Further analyzing at cross-domain in Table 3 and Table 4 shows a drastic drop. Note that, even tested on near-range objects, the model trained on far-range objects does perform well. This supports the conclusion that domain gap is the major factor that causes the performance drop.

Bounding box recall in the two-stage POINTRCNN is further shown. Table 5 shows the results of 3D IoU threshold 0.5 and Table 6 shows the results of 3D IoU threshold 0.7. Two findings are available based on these results. First, within-domain performance consistently outperforms the recall of cross-range inference, either in the first or second stage. Second, the second stage RCNN degrades bounding box recall in the cross-range inference, which further validates that the features between different depths are transferable.

TABLE 5

Cross-Range Experiments in Bounding Box Recall of RPN Proposals and Final Predictions at IoU = 0.5

| Source/Target | (0, 30] | (30, 50] | (50, 70] |
|---|---|---|---|
| (0, 30] | 0.966/0.971 (↑) | 0.432/0.409 (↓) | 0.102/0.059 (↓) |
| (30, 50] | 0.317/0.211 (↓) | 0.940/0.952 (↑) | 0.448/0.432 (↓) |
| (50, 70] | 0.128/0.071 (↓) | 0.357/0.379 (↑) | 0.624/0.634 (↑) |

TABLE 6

Cross-Range Experiments in Bounding Box Recall of RPN Proposals and Final Predictions at IoU = 0.7

| Source/Target | (0, 30] | (30, 50] | (50, 70] |
|---|---|---|---|
| (0, 30] | 0.797/0.921 (↑) | 0.186/0.226 (↑) | 0.018/0.011 (↓) |

TABLE 3

3D Object Detection Across Different Ranges, With the AP of the Car Category Reported in $AP_{3D}$ at IoU = 0.7 Using POINTRCNN; Showing a Significant Performance Drop in Cross-Range Inference

| Source/Target | Easy | | | Moderate | | | Hard | | |
|---|---|---|---|---|---|---|---|---|---|
| | (0, 30] | (30, 50] | (50, 70] | (0, 30] | (30, 50] | (50, 70] | (0, 30] | (30, 50] | (50, 70] |
| (0, 30] | 85.50 | 0.19 | — | 86.93 | 0.63 | 0.00 | 85.05 | 0.79 | 0.00 |
| (30, 50] | 1.14 | 22.03 | — | 0.53 | 45.36 | 0.01 | 0.54 | 44.62 | 0.01 |
| (50, 70] | 0.00 | 0.00 | — | 0.00 | 2.27 | 4.55 | 0.05 | 2.27 | 4.55 |

TABLE 4

3D Object Detection Across Different Ranges, With the AP of the Car Category Reported in $AP_{BEV}$ at IoU = 0.7 Using POINTRCNN; Showing a Significant Performance Drop in Cross-Range Inference

| Source/Target | Easy | | | Moderate | | | Hard | | |
|---|---|---|---|---|---|---|---|---|---|
| | (0, 30] | (30, 50] | (50, 70] | (0, 30] | (30, 50] | (50, 70] | (0, 30] | (30, 50] | (50, 70] |
| (0, 30] | 89.08 | 0.29 | — | 89.39 | 0.73 | 0.00 | 88.74 | 0.96 | 0.00 |
| (30, 50] | 1.14 | 36.10 | — | 0.53 | 63.08 | 0.02 | 0.65 | 59.80 | 0.03 |
| (50, 70] | 0.00 | 0.00 | — | 0.00 | 4.55 | 5.06 | 0.05 | 4.55 | 5.06 |

TABLE 6-continued

Cross-Range Experiments in Bounding Box Recall of
RPN Proposals and Final Predictions at IoU = 0.7

| Source/Target | (0, 30] | (30, 50] | (50, 70) |
|---|---|---|---|
| (30, 50] | 0.154/0.140 (↓) | 0.614/0.755 (↑) | 0.163/0.186 (↑) |
| (50, 70) | 0.024/0.013 (↓) | 0.122/0.163 (↑) | 0.224/0.293 (↑) |

Multiple models may be trained that can handle object with different depths. Snapshot Ensembling produces an ensemble of accurate and diverse models from a single training process. At the heart of Snapshot Ensembling is an optimization process that visits several local minima before converging to a final solution. Model snapshots are taken at these various minima, and their average predictions are taken at test time.

Figure 2:
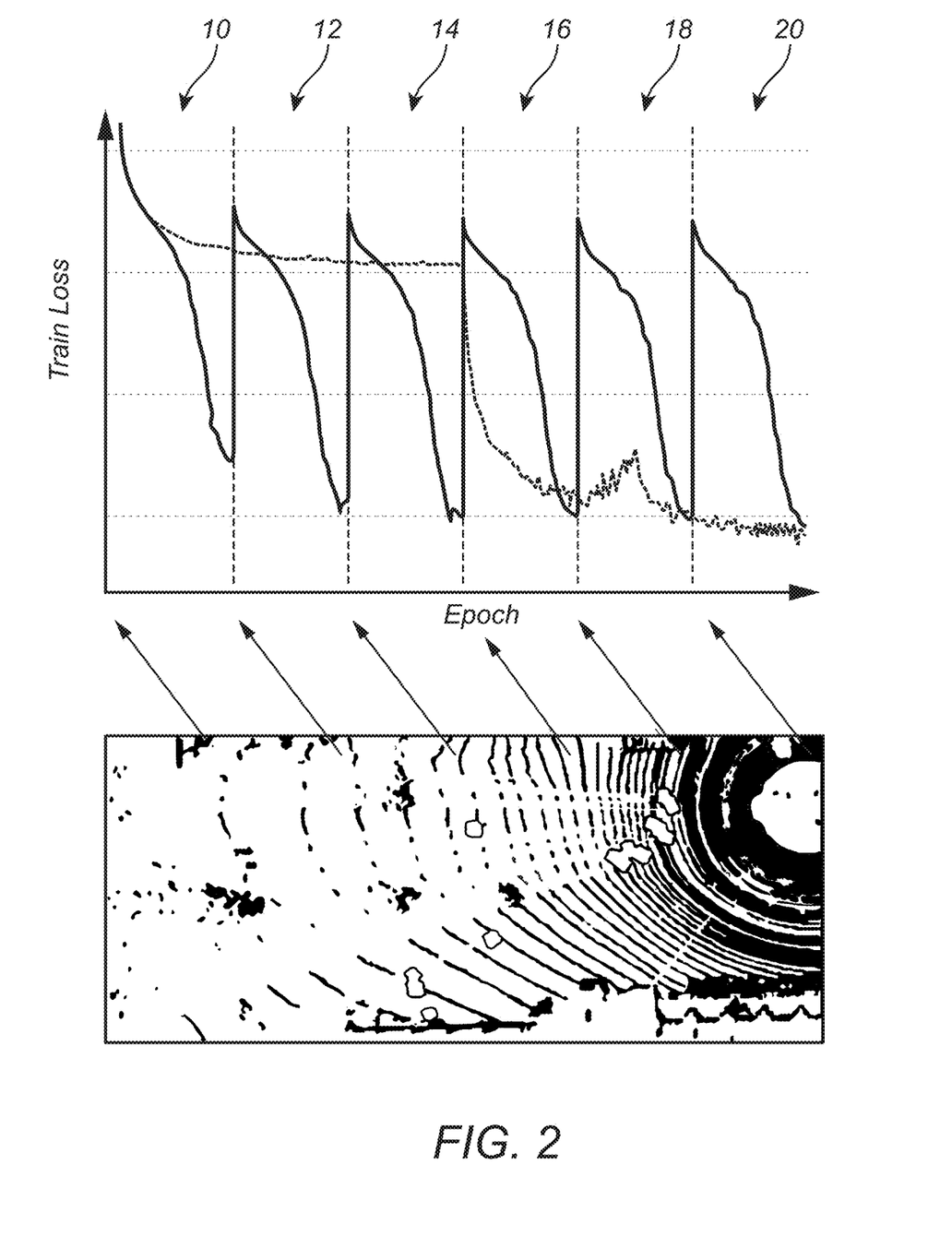
FIG. 2 is a schematic diagram illustrating the snapshot ensemble learning methodology for cross-range 3D object detection of the present disclosure.

In point cloud object detection, learning is progressive from distant to near in order to obtain multiple snapshots without increasing training cost significantly. FIG. 2 illustrates how multiple range-aware snapshots are trained 10, 12, 14, 16, 18, 20. Concretely, far-range objects are first fed into the model to train the first snapshot 10, 12. This approach leverages the non-convex nature of NNs and the ability of stochastic gradient descent (SGD) to converge to and escape from local minima on demand. Each time the model converges, the weights are saved and the corresponding network is added to the ensemble. The middle range objects are then added into the training procedure 14, 16. Meanwhile, the optimization is restarted with a large learning rate to escape the current local minimum. Instead of training M neural networks independently from scratch, SGD is allowed to converge M times to local minima along its optimization path. More specifically, a cycling procedure is adopted, in which the learning rate is abruptly raised and then quickly lowered to follow a cosine function. Once multiple models have been obtained, inference is applied in the point clouds that performs non-maximum suppression (NMS) on the predictions of all snapshot models.

There are two types of snapshot ensembles for cross-range 3D object detection. (1) During training, a point cloud is divided into N sub-groups and the model is trained separately for each sub-group. In the inference, the model is also tested in the corresponding sub-group point cloud. The benefit of this type of ensemble learning is that it does not increase testing time. (2) During training, the whole point cloud is still trained on while progressively adding in examples from distant to near, without increasing training cost significantly. In the testing, it may be necessary to feed forward the whole point cloud into different snapshot models multiple times.

Figure 3:
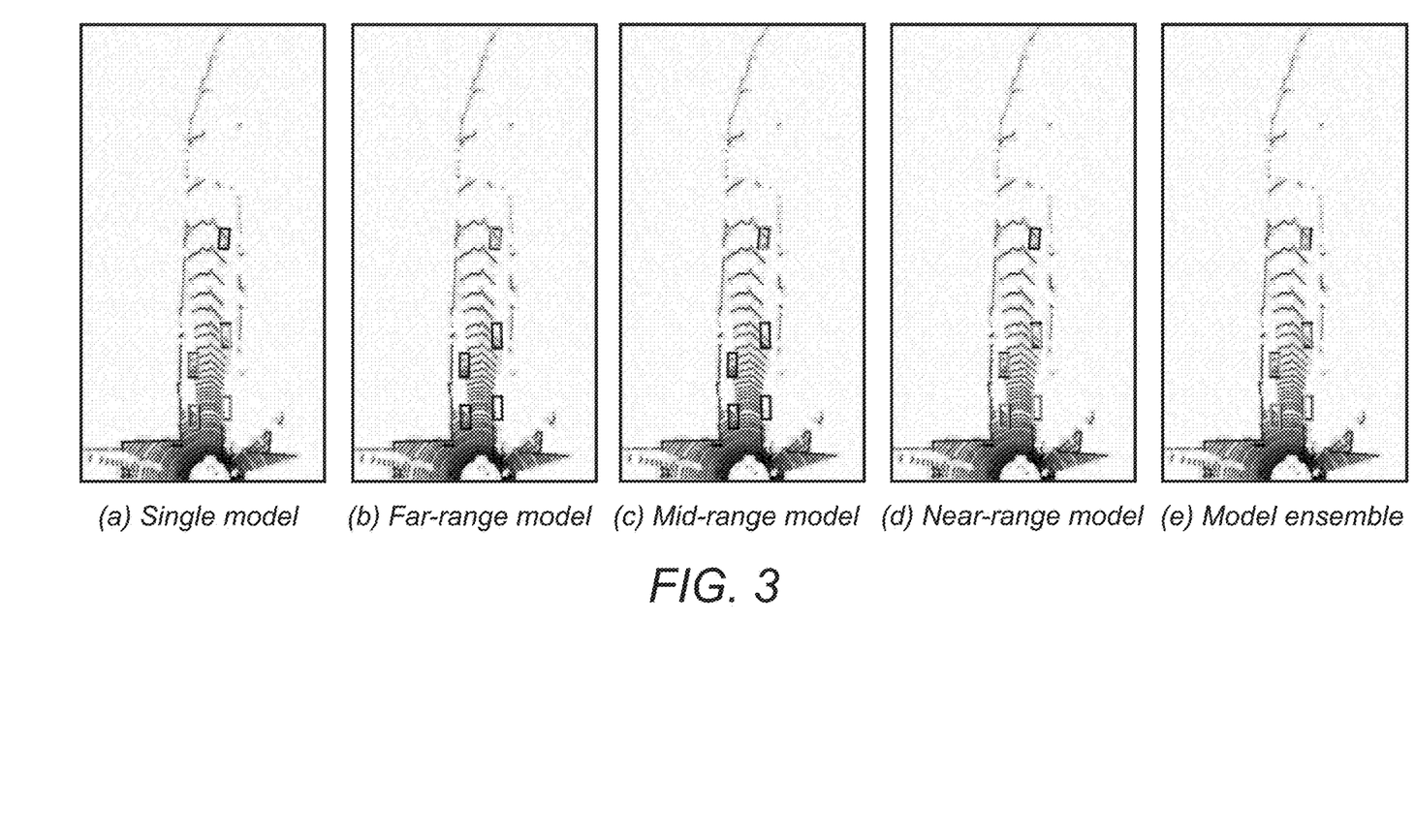
FIG. 3 illustrates the qualitative results of 3D prediction on a dataset using various models, the bounding boxes indicating ground truths and predictions, demonstrating that the model ensemble of the present disclosure captures far-range objects, while a single model neglects them.

In order to validate the model ensemble, an N-sub-group ensemble is trained learning on the dataset. Specifically, a point cloud is split into three range groups as per the previous experiments. Three snapshots are then trained using the POINTRCNN. Table 7 shows preliminary results as compared to the original single model performance. It can be seen that the ensemble model of the present disclosure is simple, yet effective. It consistently yields better AP than the baseline model at no additional training (for (2)) or testing (for (1)) cost. The qualitative results are also provided in FIG. 3. In FIG. 3, the bounding boxes indicate the ground truths and predictions. The model ensemble captures far-range objects, while the single model neglects them. It is clearly shown that the proposed framework increases the recall for far-range objects. Three snapshots in different ranges can be complementary to each other and contribute to a better ensemble model.

TABLE 7

Results of Ensemble Learning for Cross-Range 3D Object Detection in AP3D

| Method | (0, 30] | | | (30, 50] | | | (50, 70.4] | | |
|---|---|---|---|---|---|---|---|---|---|
|  | Easy | Moderate | Hard | Easy | Moderate | Hard | Easy | Moderate | Hard |
| Single model | 87.22 | 81.67 | 76.32 | 0.70 | 12.07 | 13.14 | — | 0.04 | 0.06 |
| Ensemble | 86.62 | 82.11 | 79.12 | 18.41 | 42.60 | 39.96 | — | 4.54 | 2.27 |

Thus, the present disclosure provides an empirical analysis and finds a key component to bridge the gap between different ranges (i.e., depths) of objects in LiDAR-based 3D object detection. The resulting technique, referred to as range-aware ensemble learning, is simple, yet effective. This plug-and-play technique is a potential solution for solving cross-range perception problems in real-world DA and AD vehicles, due to its simple and cost-effective nature.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Figure 4:
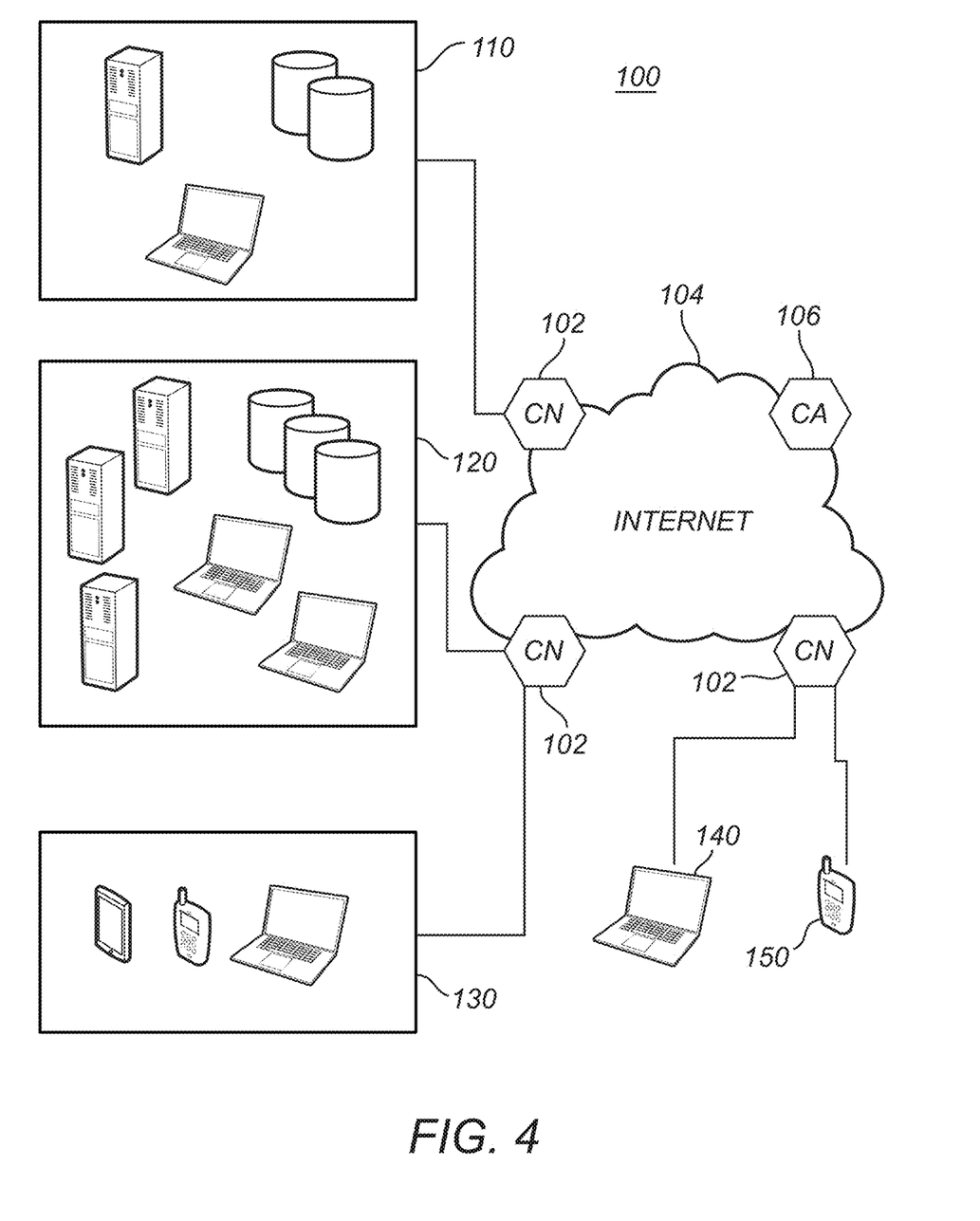
FIG. 4 is a network diagram of a cloud-based system for implementing the various cloud-based algorithms and services of the present disclosure.
Figure 5:
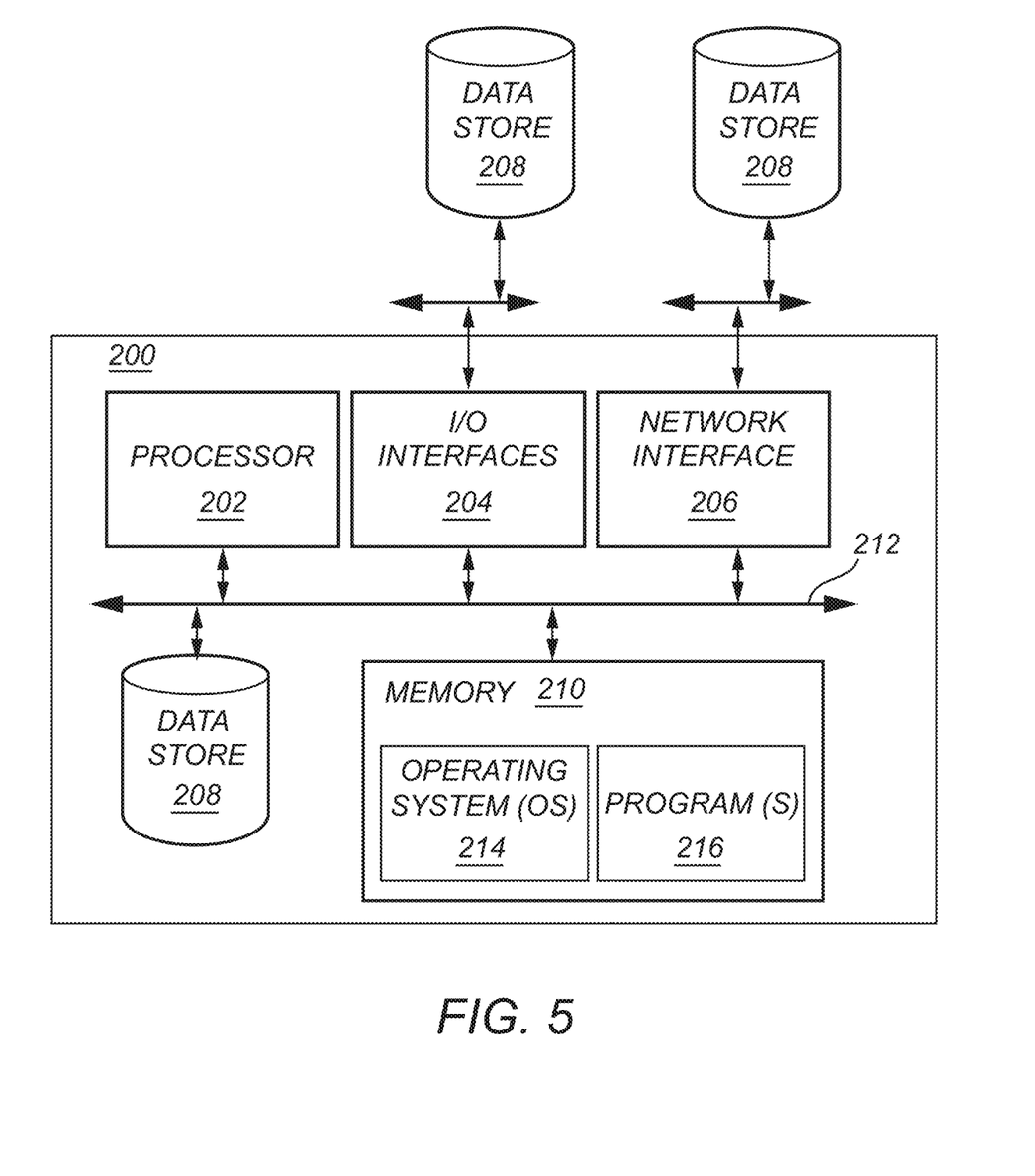
FIG. 5 is a block diagram of a server which may be used in the cloud-based system of FIG. 4 or stand-alone.

FIG. 4 is a network diagram of a cloud-based system 100 for implementing various cloud-based services of the present disclosure. The cloud-based system 100 includes one or more cloud nodes (CNs) 102 communicatively coupled to the Internet 104 or the like. The cloud nodes 102 may be implemented as a server 200 (as illustrated in FIG. 5) or the like and can be geographically diverse from one another, such as located at various data centers around the country or globe. Further, the cloud-based system 100 can include one or more central authority (CA) nodes 106, which similarly can be implemented as the server 200 and be connected to the CNs 102. For illustration purposes, the cloud-based system 100 can connect to a regional office 110, headquarters 120, various employee's homes 130, laptops/desktops 140, and mobile devices 150, each of which can be communicatively coupled to one of the CNs 102. These locations 110, 120, and 130, and devices 140 and 150 are shown for illustrative purposes, and those skilled in the art will recognize there are various access scenarios to the cloud-based system 100, all of which are contemplated herein. The devices 140 and 150 can be so-called road warriors, i.e., users off-site, on-the-road, etc. The cloud-based system 100 can be a private cloud, a public cloud, a combination of a private cloud and a public cloud (hybrid cloud), or the like.

Again, the cloud-based system 100 can provide any functionality through services, such as software-as-a-service (SaaS), platform-as-a-service, infrastructure-as-a-service, security-as-a-service, Virtual Network Functions (VNFs) in a Network Functions Virtualization (NFV) Infrastructure (NFVI), etc. to the locations 110, 120, and 130 and devices 140 and 150. Previously, the Information Technology (IT) deployment model included enterprise resources and applications stored within an enterprise network (i.e., physical devices), behind a firewall, accessible by employees on site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators.

Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud-based system 100 is illustrated herein as one example embodiment of a cloud-based system, and those of ordinary skill in the art will recognize the systems and methods described herein are not necessarily limited thereby.

FIG. 5 is a block diagram of a server 200, which may be used in the cloud-based system 100 (FIG. 4), in other systems, or stand-alone. For example, the CNs 102 (FIG. 4) and the central authority nodes 106 (FIG. 4) may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 5 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but is not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104 (FIG. 4). The network interface 206 may include, for example, an Ethernet card or adapter (e.g., 10 BaseT, Fast Ethernet, Gigabit Ethernet, or 10 GbE) or a Wireless Local Area Network (WLAN) card or adapter (e.g., 802.11 a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., a SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

It will be appreciated that some embodiments described herein may include one or more generic or specialized processors ("one or more processors") such as microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable medium having computer-readable code stored thereon for programming a computer, server, appliance, device, processor, circuit, etc. each of which may include a processor to perform functions as described and claimed herein. Examples of such computer-readable mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Figure 6:
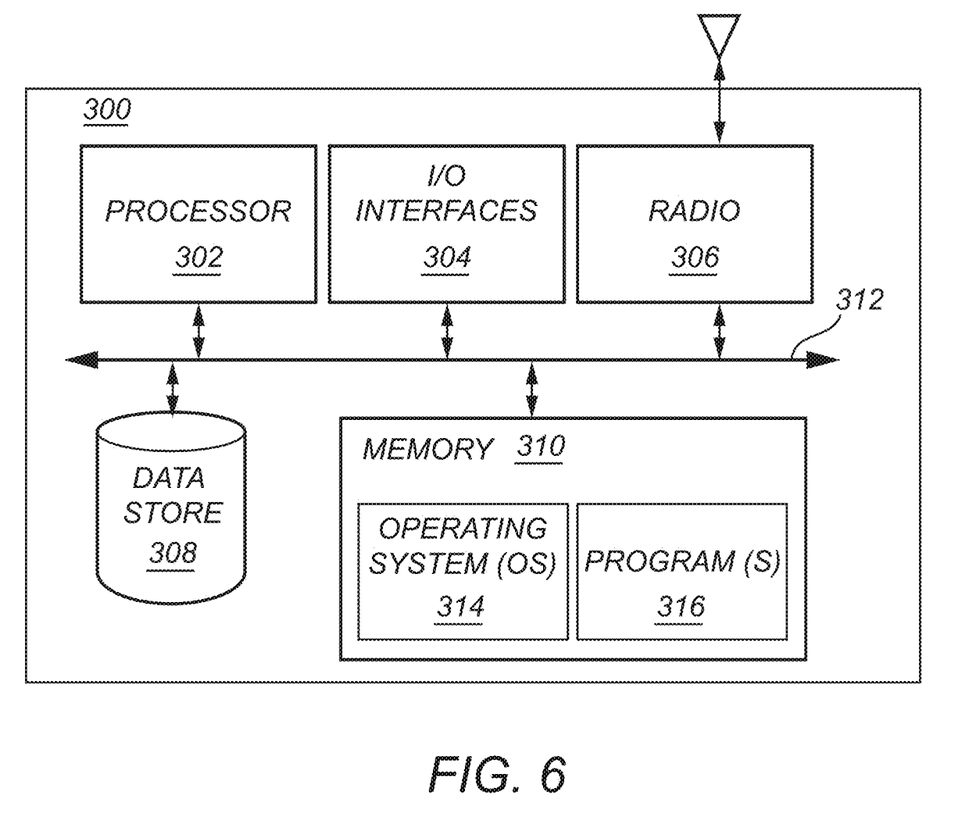
FIG. 6 is a block diagram of a user device which may be used in the cloud-based system of FIG. 4 or stand-alone.

FIG. 6 is a block diagram of a user device 300, which may be used in the cloud-based system 100 (FIG. 4), as part of a network, or stand-alone. Again, the user device 300 can be a vehicle, a smartphone, a tablet, a smartwatch, an Internet of Things (IoT) device, a laptop, a virtual reality (VR) headset, etc. The user device 300 can be a digital device that, in terms of hardware architecture, generally includes a processor 302, I/O interfaces 304, a radio 306, a data store 308, and memory 310. It should be appreciated by those of ordinary skill in the art that FIG. 6 depicts the user device 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 can be, for example, but is not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a liquid crystal display (LCD), touch screen, and the like.

The radio 306 enables wireless communication to an external access device or network. Any number of suitable wireless data communication protocols, techniques, or methodologies can be supported by the radio 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

Again, the memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 6, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network, such as the cloud-based system 100 (FIG. 4).

Although the present disclosure is illustrated and described herein with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A cross-range 3D object detection method, comprising:
generating a point cloud only utilizing data indicated from a single measurement of a single optical device of a vehicle;
dividing the point cloud into N sub-groups corresponding to N detection distance ranges from the vehicle and defined with respect to the optical device, wherein N is an integer of three or more;
sequentially training a same neural network for 3D object detection with the N sub-groups of the point cloud corresponding to the N detection distance ranges from the vehicle and defined with respect to the optical device to form N 3D object detection algorithm versions corresponding to the N detection distance ranges utilizing stochastic gradient descent to converge and escape from a local minima of each of the N 3D object detection algorithm versions in combination with a cycling procedure in which a learning rate is abruptly raised and then quickly lowered to follow a cosine function and utilizing online ground truth boxes augmentation in which object boxes and inside points from one scene are copied to the same locations in another scene; and
combining the N 3D object detection algorithm versions trained form the same neural network to form an ensemble 3D object detection algorithm utilizing Snapshot Ensembling such that inference is applied to the N sub-groups of the point cloud by performing non-maximum suppression on predictions of all of the N 3D object detection algorithm versions.

2. The method of claim 1, wherein sequentially training the same neural network for 3D object detection model with the N sub-groups of the point cloud corresponding to the N detection distance ranges comprises training the same neural network for 3D object detection progressively from distant to near.

3. The method of claim 1, wherein sequentially training the same neural network for 3D object detection with the N sub-groups of the point cloud corresponding to the N detection distance ranges comprises, each time the same neural network-converges, saving resulting weights and adding a corresponding network to the ensemble 3D object detection algorithm.

4. The method of claim 1, wherein sequentially training the same neural network for 3D object detection with the N sub-groups of the point cloud corresponding to the N detection distance ranges comprises training the same neural network separately for each of the N sub-groups.

5. The method of claim 1, wherein sequentially training the same neural network for 3D object detection with the N sub-groups of the point cloud corresponding to the N detection distance ranges comprises training the same neural network with the entire point cloud while progressively adding the N sub-groups from distant to near.

6. The method of claim 1, wherein the 3D object detection algorithm versions each consist of a differently trained version of the same neural network for 3D object detection.

7. The method of claim 1, wherein generating the point cloud only utilizing data indicated from the single measurement of the single optical device of the vehicle comprises generating the point cloud from a single image.

8. A cross-range 3D object detection system, comprising:
a memory storing instructions executed by a processor for:
generating a point cloud only utilizing data indicated from a single measurement of a single optical device of a vehicle;
dividing the point cloud into N sub-groups corresponding to N detection distance ranges from the vehicle and defined with respect to the optical device, wherein N is an integer of three or more;
sequentially training a same neural network for 3D object detection with the N sub-groups of the point cloud corresponding to the N detection distance ranges from the vehicle and defined with respect to the optical device to form N 3D object detection algorithm versions corresponding to the N detection distance ranges utilizing stochastic gradient descent to converge and escape from a local minima of each of the N 3D object detection algorithm versions in combination with a cycling procedure in which a learning rate is abruptly raised and then quickly lowered to follow a cosine function and utilizing online ground truth boxes augmentation in which object boxes and inside points from one scene are copied to the same locations in another scene; and
combining the N 3D object detection algorithm versions trained form the same neural network to form an ensemble 3D object detection algorithm utilizing Snapshot Ensembling such that inference is applied to the N sub-groups of the point cloud by performing non-maximum suppression on predications of all of the N 3D object detection algorithm versions.

9. The system of claim 8, wherein sequentially training the same neural network for 3D object detection with the N sub-groups of the point cloud corresponding to the N detection distance ranges comprises training the same neural network for 3D object detection progressively from distant to near.

10. The system of claim 8, wherein sequentially training the same neural network for 3D object detection with the N sub-groups of the point cloud corresponding to the N detection distance ranges comprises, each time the same neural network-converges, saving resulting weights and adding a corresponding network to the ensemble 3D object detection algorithm.

11. The system of claim 8, wherein sequentially training the same neural network for 3D object detection with the N sub-groups of the point cloud corresponding to the N detection distance ranges comprises training the same neural network separately for each of the N sub-groups.

12. The system of claim 8, wherein sequentially training the same neural network 3D object detection with the N sub-groups of the point cloud corresponding to the N detection distance ranges comprises training the same neural network with the entire point cloud while progressively adding the N sub-groups from distant to near.

13. The system of claim 8, wherein the N 3D object detection algorithm versions each consist of a differently trained version of the same neural network for 3D object detection.

* * * * *